April 17, 1956 J. A. KOZEL 2,742,053
CHECK VALVE
Filed Sept. 17, 1954

INVENTOR
JAMES A. KOZEL
BY
ATTORNEYS

United States Patent Office 2,742,053
Patented Apr. 17, 1956

2,742,053
CHECK VALVE

James A. Kozel, Chicago, Ill., assignor to The Dole Valve Company, Chicago, Ill., a corporation of Illinois Application September 17, 1954, Serial No. 456,804

3 Claims. (Cl. 137—512.15)

This invention relates to improvements in valves and more particularly relates to an improved form of flexible check valve particularly adapted for mixing valves for hot and cold water.

A principal object of the invention is to provide a simple and improved form of check valve in which the valve serves as a seal for the seat for the valve.

Another object of the invention is to provide a novel and simple form of check valve particularly adapted for use in annular fluid passageways.

Still another object of the invention is to provide an improved form of check valve particularly designed and suited for use in fluid mixing valves having a mixing chamber therein and a passageway by-passing the mixing chamber to check the back flow of fluid from the mixing chamber.

Further, it is an object of the invention to provide a fluid mixing valve having a mixing chamber and a hot water passageway by-passing the mixing chamber and a concentric annular hot water passageway leading to the mixing chamber and having a check valve therein, to prevent any undesired reverse fluid flow from the mixing chamber through the annular passageway.

Still another object of the invention is to provide a simple and improved form of check valve for an annular passageway in which the walls of the passageway are a thermoplastic material and the check valve is in the form of flexible annulus, wherein the seat for the valve is made of metal and forms a retainer therefor, and seals the inner margin of the valve to its passageway and retains the valve thereto by cutting into the thermoplastic wall thereof.

These and other objects of the invention will appear from time to time as the following specification proceeds and with reference to the accompanying drawings wherein.

Figure 2:
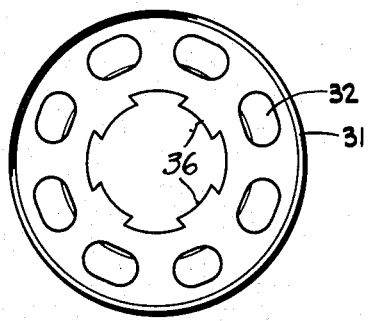
Figure 2 is a plan view of the retainer for the check valve.
Figure 3:
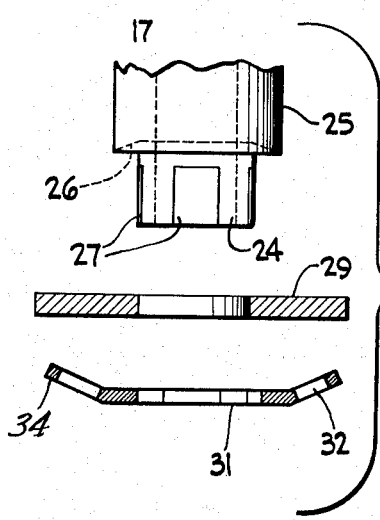
Figure 3 is an exploded view of the check valve, its seat and retainer, illustrating the individual parts of the valve and the means of assembly thereof.
Figure 1:
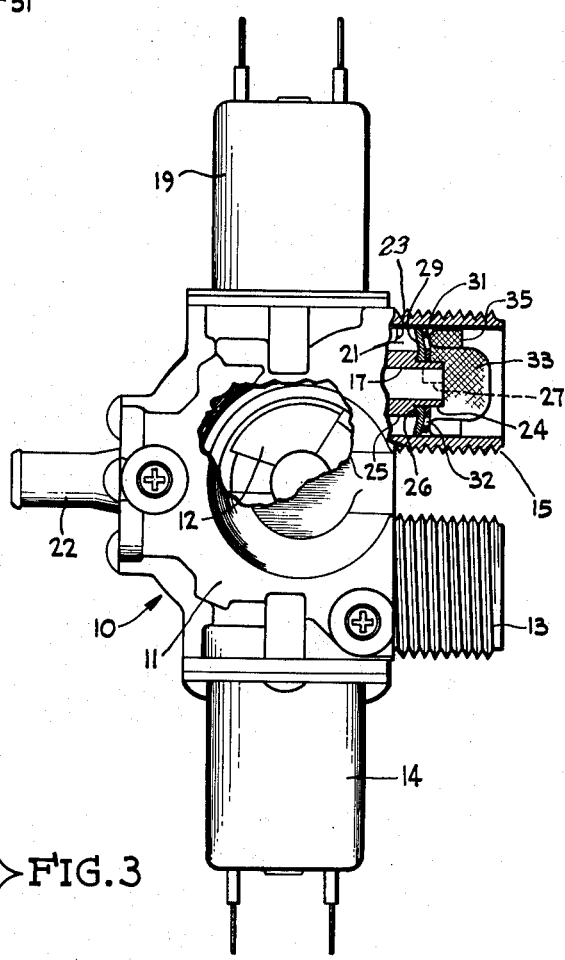
Figure 1 is a top plan view of a mixing valve having a check valve constructed in accordance with the invention associated therewith, and shown as being mounted in the hot water inlet for the valve.

In the embodiment of the invention illustrated in the drawing, I have shown a mixing valve 10 of a type similar to that shown in my joint application with Victor E. Rimsha Serial No. 380,952 filed on September 18, 1953 and entitled "Thermostatically Controlled Mixing Valve." The valve 10 comprises generally a valve body 11 which may be molded from one of the well known forms of thermoplastic materials, a preferred material being a "nylon" thermoplastic material.

The valve body 11 has a central mixing chamber 12 with a cold water inlet 13 leading into said body and mixing chamber 12 under the control of suitable valve means (not shown), controlled by a solenoid 14. A hot water inlet 15 also leads into the valve body 11 and, as herein shown, has a central inlet passageway 17 leading to a hot water by-pass passageway (not shown), by-passing hot water around the mixing chamber 12 directly through an outlet 22 under the control of other valve means (not shown) controlled by a solenoid 19. The hot water inlet 15 also has an outer concentric annular inlet passageway 21 leading to the mixing chamber 12 under the control of thermostatically operated valve means (not shown) as in the aforementioned application Serial No. 380,952, and no part of the present invention, so not herein shown or described further.

The annular inlet passageway 21 is shown as having an outer wall 23 and a stepped inner wall, providing a reduced diameter wall 24 on the upstream side of said inlet passageway and an enlarged diameter wall 25 spaced from the wall 24 in a downstream direction. The walls 24 and 25 are shown as being joined by an inclined shoulder 26, inclined from the periphery of the the wall 25 inwardly in a downstream direction and defining the inner margin of the wall 24.

The wall 24 is shown as having grooves 27 formed therein to provide splines therebetween and stopping short of the inner margin of the shoulder 26 to form a continuous wall adjacent the shoulder 26 for an annular flexible valve 29.

The valve 29 is herein shown as being in the form of a flexible annulus, generally rectangular in cross section and made from rubber, an elastomer or like flexible material, which will readily flex and return to its unflexed condition of its own resiliency, and which will be unaffected by the heat of the water flowing thereby to the mixing chamber 12.

An annular retainer 31 is shown as having a plurality of flow passageways 32 passing through a seating portion 34 for the valve 29 inclined from the shoulder 26 in the direction of flow through the passageway 21 at a relatively flat angle. The retainer 31 is of a lesser outer diameter than the outside diameter of the annular valve 29, to accommodate back pressure on the valve to flex the valve 29 into engagement with the wall 23 and backward along the recess formed between the wall 23 and the inclined periphery of the retainer 31, to provide an effective seal between the periphery of the valve 29 and the wall 23.

The retainer 31 is preferably made from metal in contrast to the thermoplastic or "nylon" wall 24 of the passageway 21 and is internally splined, as indicated by reference character 36. The splines of said retainer are adapted to register with the grooves 27 of the reduced diameter splined wall portion 24. The retainer 31 is inserted within the inlet 21 by sliding movement therealong with the splines 36 thereof fitting within corresponding grooves 27 of the splined wall portion 24. In this position the retainer will press the annular valve into tight engagement with the shoulder 26 and seal said valve to said recessed inclined shoulder 26. When the valve 29 is in position in the passageway 21 and pressed into engagement with the inclined shoulder 26, the retainer 31 may be turned. The retainer 31 being metal and harder than the "nylon" wall 24 the splines of the retainer 31 will cut into the splines between the grooves 27 and cut grooves therein to positively lock said retainer to the wall 24 and positively seal the valve to the shoulder 26.

A screen 33 is shown as being provided in the inlet 15 and forms a strainer therefor. The screen 33 is shown as being of a hat-like form, having a backwardly turned rim 35, extending along the wall 23 of the inlet, and retained to said inlet by pressing against the wall thereof.

It may be seen from the foregoing that hot water entering the valve body through the hot water inlet will flow through the central passageway 17 into the valve body directly to the valve operated by the solenoid 19 and controlling the passage of hot water past the mixing chamber directly through the outlet 22. Hot water will also flow through the concentric passageway 21 and hinge the annular flexible valve 29 about the edge of the shoulder 26 out of engagement with the wall 23, to accommodate hot water to flow to the valve controlling the flow of hot water to the mixing chamber. Any back flow of water, however, will tightly engage the periphery of the annular valve 29 with the seat and retainer 31, pressing said valve in the space between the wall 23 and the periphery of said seat and retainer, and blocking the back flow of water from the passageway 21 into the hot water inlet.

It may thus be seen that a novel and improved form of check valve has been provided, for controlling the flow of fluid through an annular passageway, wherein the check valve is in the form of a resilient annulus and forms a seal for the annular passageway, permanently sealed along its inner periphery and moved into engagement along its outer margin between the seat and passageway upon the tendency of fluid to flow backwardly through the annular passageway.

It may further be seen that the retainer and seat for the valve comprises a simplified form of annulus, the inner margin of which is pressed into sealing engagement with a shouldered portion of the annular passageway and is retained in position in the passageway by turning the retainer to cut into splines on the inner wall of the passageway, to hold the valve in position in the passageway, sealed to the shouldered portion thereof.

It will be understood that modifications and variations of the present invention may be effected without departing from the spirit and scope of the novel concepts thereof.

I claim as my invention:

1. In a valve of a class described, a thermoplastic valve body having an inlet passageway having a generally circular inner wall, said inner wall being stepped and having an inwardly inclined shoulder formed therein and facing in an upstream direction, a flexible annular valve member encircling said inner wall and having sealing engagement with said shoulder, said inner wall being splined for a portion of the length thereof, and a metallic retainer and seat having flow passageways leading therethrough, said retainer being internally splined and extending over said valve member and retaining said valve member into sealing engagement with said shoulder by slidable movement along said inlet in registery with the splines of said inner wall and by turning movement thereof, to cut retaining grooves in the splines of said inner wall.

2. In a valve of the class described, a thermoplastic valve body having an inlet having two concentric passageways, the walls of which are circular, the inner passageway having an outer wall portion of one diameter at the upstream end thereof and an outer wall portion of an increased diameter spaced from said wall portion of smaller diameter in a downstream direction, an inclined shoulder joining said wall portions together and inclined inwardly from the wall portion of larger diameter to the wall portion of smaller diameter in the direction of flow through said inlet, said wall portion of smaller diameter having splines formed therein and the splines thereof stopping short of said shoulder to provide a smooth wall portion adjacent said shoulder, an annular flexible valve member encircling said smooth wall portion and seated against said inclined shoulder and having engagement with the inner wall of the outer of said passageways, and a metal annular seat and retainer having flow passageways leading therethrough and having internal splines registrable in the spaces between the splines of said inner passageway and retaining said valve member to said shoulder by the twisting of said seat and retainer and cutting of grooves in the external splines of said wall portion of smaller diameter.

3. In a check valve, a thermoplastic valve body having an annular fluid inlet passageway having a shouldered inner wall and a concentric outer wall facing said shouldered inner wall, the shouldered portion of said inner wall being inclined inwardly in the direction of flow through said inlet passageway and facing in an upstream direction, an annular flexible valve engageable with said inclined shoulder and extending to the periphery of said concentric outer wall, and retainer, annular in form, having a plurality of flow passageways leading therethrough and having splines formed in its inner periphery, the smaller diameter portion of said shouldered inner wall of said passageway having splines and the spaces between the splines thereof being registrable with the splines in said seat and retainer, and stopping short of said shouldered portion to provide a smooth wall portion adjacent said shouldered portion for said valve, and said seat and retainer sealing said valve to said shoulder by slidable movement of said seat and retainer along the splines of said shouldered inner wall and turning movement of said seat and retainer to cut grooves in said splines, and said seat and retainer also being of a smaller external diameter than the internal diameter of the outer wall of said passageway and accommodating said valve to engage said outer wall and the periphery of said seat and retainer and maintain a fluid seal therebetween upon the back pressure of fluid in said passageway.

References Cited in the file of this patent

UNITED STATES PATENTS

| | | |
|---|---|---|
| 28,058 | Boyle | May 1, 1860 |
| 2,033,442 | Morris | Mar. 10, 1936 |
| 2,329,960 | Verheul | Sept. 21, 1943 |
| 2,332,787 | Fleming | Oct. 26, 1943 |
| 2,387,013 | Fuller | Oct. 16, 1945 |
| 2,450,694 | Sauer | Oct. 5, 1948 |
| 2,561,036 | Sodders | July 17, 1951 |
| 2,672,157 | Branson | Mar. 16, 1954 |